United States Patent
Shimauchi (10) Patent No.: US 12,330,474 B2
(45) Date of Patent: Jun. 17, 2025

(54) CONTROL DEVICE AND CONTROL METHOD

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 931 days.

(21) Appl. No.: 17/465,082

(22) Filed: Sep. 2, 2021

(65) Prior Publication Data

US 2022/0097476 A1 Mar. 31, 2022

(30) Foreign Application Priority Data

Sep. 29, 2020 (JP) ................................ 2020-163307

(51) Int. Cl.
*B60H 1/00* (2006.01)
*B60H 1/03* (2006.01)
*B60L 58/27* (2019.01)

(52) U.S. Cl.
CPC ............. *B60H 1/0073* (2019.05); *B60H 1/03* (2013.01); *B60L 58/27* (2019.02); *B60H 2001/00949* (2013.01)

(58) Field of Classification Search
None
See application file for complete search history.

(56) References Cited

U.S. PATENT DOCUMENTS

| | | | |
|---|---|---|---|
| 9,719,406 B2 * | 8/2017 | Gonze | F01P 7/14 |
| 11,653,480 B1 * | 5/2023 | Vines | H05K 5/0212 |
| | | | 701/23 |
| 2002/0099482 A1 * | 7/2002 | Reese, II | F01P 11/14 |
| | | | 701/31.4 |
| 2002/0193921 A1 * | 12/2002 | Reese, II | F01P 11/16 |
| | | | 701/1 |
| 2003/0047149 A1 * | 3/2003 | Shinpo | F01P 7/167 |
| | | | 123/41.1 |
| 2006/0005790 A1 * | 1/2006 | Braun | F02M 26/28 |
| | | | 123/41.1 |
| 2010/0083916 A1 * | 4/2010 | Shintani | F01P 7/164 |
| | | | 123/41.1 |
| 2010/0326127 A1 * | 12/2010 | Oomura | B60H 1/3208 |
| | | | 62/498 |
| 2011/0166711 A1 * | 7/2011 | Markowitz | B60H 1/00885 |
| | | | 165/203 |
| 2011/0178665 A1 * | 7/2011 | Yoshioka | B60W 10/06 |
| | | | 903/903 |

(Continued)

FOREIGN PATENT DOCUMENTS

| | | |
|---|---|---|
| DE | 102018214679 A1 | 3/2020 |
| EP | 3121040 A1 | 1/2017 |

(Continued)

*Primary Examiner* — Edelmira Bosques
*Assistant Examiner* — Deepak A Deean
(74) *Attorney, Agent, or Firm* — Dinsmore & Shohl LLP (57) ABSTRACT

A control device configured to control a vehicle coolant circuit includes a processor. The processor is configured to calculate a target coolant temperature, and control heat sources based on the target coolant temperature. The processor is configured to correct the target coolant temperature in consideration of a loss of heat of a coolant in a coolant passage.

6 Claims, 5 Drawing Sheets

(56) References Cited

U.S. PATENT DOCUMENTS

| | | | |
|---|---|---|---|
| 2012/0132394 A1* | 5/2012 | Oberti | B60K 11/02 165/51 |
| 2015/0105957 A1* | 4/2015 | Okamoto | B60H 1/025 180/65.265 |
| 2016/0201547 A1* | 7/2016 | Gonze | F01P 7/14 165/287 |
| 2017/0054167 A1* | 2/2017 | Park | H01M 8/04768 |
| 2017/0347500 A1* | 11/2017 | Lee | F01P 5/02 |
| 2018/0274430 A1* | 9/2018 | Honda | F01P 3/20 |
| 2019/0118613 A1* | 4/2019 | Ragazzi | B60H 1/00807 |
| 2019/0135071 A1 | 5/2019 | Hwang et al. | |
| 2019/0299791 A1* | 10/2019 | Gonze | H01M 10/66 |
| 2021/0061067 A1* | 3/2021 | Kim | B60H 1/00921 |
| 2023/0020687 A1* | 1/2023 | Kim | H01M 10/613 |

FOREIGN PATENT DOCUMENTS

| | | |
|---|---|---|
| JP | 59-120510 A | 7/1984 |
| JP | H11028930 A | 2/1999 |
| JP | 2017-100674 A | 6/2017 |
| JP | 2019-085102 A | 6/2019 |

\* cited by examiner

CONTROL DEVICE AND CONTROL METHOD

CROSS-REFERENCE TO RELATED APPLICATION

This application claims priority to Japanese Patent Application No. 2020-163307 filed on Sep. 29, 2020, incorporated herein by reference in its entirety.

BACKGROUND

1. Technical Field

The present disclosure relates to a control device and a control method.

2. Description of Related Art

There is known a vehicle air conditioner configured to heat a vehicle cabin (see, for example, Japanese Unexamined Patent Application Publication No. 11-28930 (JP 11-28930 A)).

The vehicle air conditioner of JP 11-28930 A includes a water pump, a fuel burner air heater, a water-cooled condenser of a heat pump, a heater core, and a coolant passage connecting those components. The water pump circulates a coolant (heat medium) in a coolant circuit. The fuel burner air heater and the water-cooled condenser heat the coolant. The heater core is arranged in a blower duct that is a passage of blow air, and heats the blow air with the coolant flowing through the heater core. In the vehicle air conditioner, the blow air (conditioned air) heated by the heater core is blown into the vehicle cabin through an air outlet.

SUMMARY

In the coolant circuit including a plurality of heat sources as described above, a loss of heat of the coolant in the coolant passage (pipe heat loss) may increase and the temperature of the coolant may decrease due to complication of the coolant passage. When the temperature of the coolant decreases, for example, a heating capacity may be insufficient in a case where the heat of the coolant is used for heating the vehicle cabin, and a warming capacity may be insufficient in a case where the heat of the coolant is used for warming a battery or the like.

The present disclosure provides a control device and a control method capable of suppressing the decrease in the temperature of the coolant due to the pipe heat loss.

A control device according to a first aspect of the present disclosure is configured to control a vehicle coolant circuit including a water pump configured to circulate a coolant, a plurality of heat sources configured to heat the coolant, a heat using portion configured to use heat of the coolant, and a coolant passage configured to connect the water pump, the heat sources, and the heat using portion. The control device includes a processor. The processor is configured to calculate a target coolant temperature and control the heat sources based on the target coolant temperature. The processor is configured to correct the target coolant temperature in consideration of a loss of the heat of the coolant in the coolant passage.

In the control device according to the first aspect of the present disclosure, the decrease in the temperature of the coolant due to the pipe heat loss can be suppressed by correcting the target coolant temperature in consideration of the loss of the heat of the coolant in the coolant passage.

In the control device according to the first aspect of the present disclosure, the processor may be configured to calculate, based on an outside air temperature, a correction value for correcting the target coolant temperature in consideration of the loss of the heat of the coolant in the coolant passage.

In the control device according to the first aspect of the present disclosure, the processor may be configured to calculate, based on a coolant flow rate, a correction value for correcting the target coolant temperature in consideration of the loss of the heat of the coolant in the coolant passage.

In the control device according to the first aspect of the present disclosure, the heat using portion may be a heater core or a battery. The processor may be configured to, when the heat using portion is the heater core, control the vehicle coolant circuit to use the heat of the coolant for heating a vehicle cabin. The processor may be configured to, when the heat using portion is the battery, control the vehicle coolant circuit to use the heat of the coolant for warming the battery.

In the control device according to the first aspect of the present disclosure, the heat sources may include a coolant heater and a heat exchanger of a heat pump.

A control method according to a second aspect of the present disclosure is a method for controlling a vehicle coolant circuit including a water pump configured to circulate a coolant, a plurality of heat sources configured to heat the coolant, a heat using portion configured to use heat of the coolant, and a coolant passage configured to connect the water pump, the heat sources, and the heat using portion. The control method includes calculating a target coolant temperature and correcting the target coolant temperature in consideration of a loss of the heat of the coolant in the coolant passage, and controlling the heat sources based on the corrected target coolant temperature.

In the control device according to the first aspect of the present disclosure and the control method according to the second aspect of the present disclosure, it is possible to suppress the decrease in the temperature of the coolant due to the pipe heat loss.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure are described below.

First Embodiment

First, the overall configuration of a vehicle 100 to which an ECU 6 according to a first embodiment of the present disclosure is applied is described with reference to FIG. 1 and FIG. 2.

Figure 1:
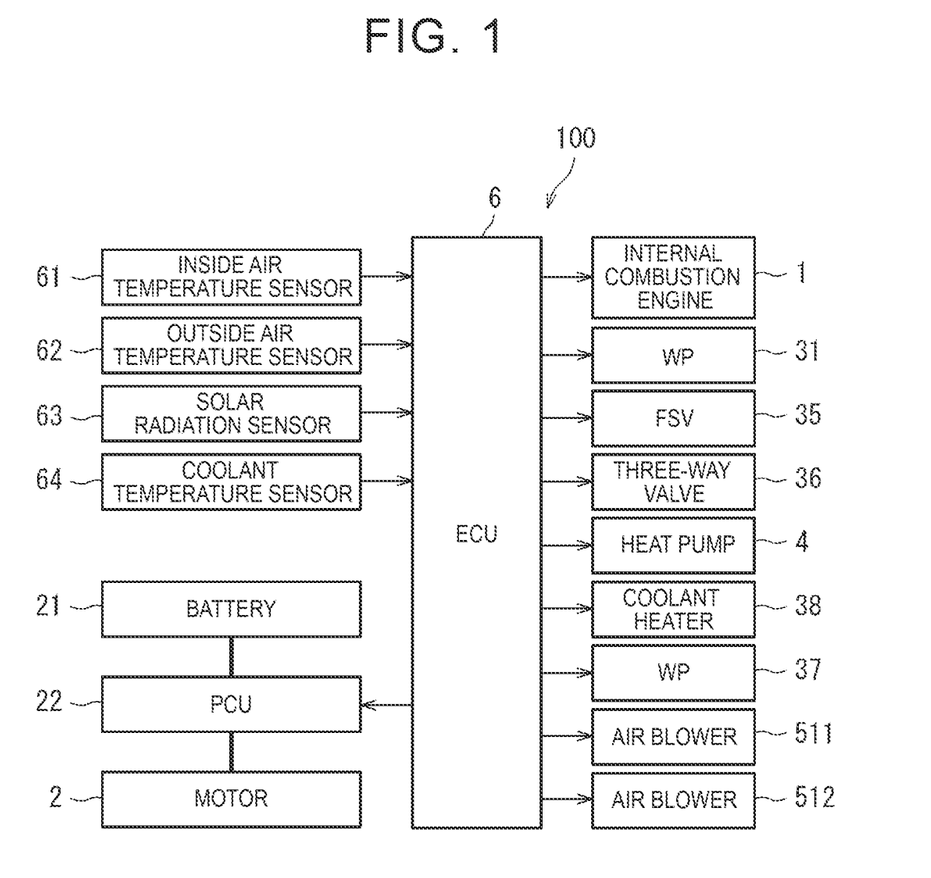
FIG. 1 is a block diagram illustrating the overall configuration of an electronic control unit (ECU) of a first embodiment.
Figure 2:
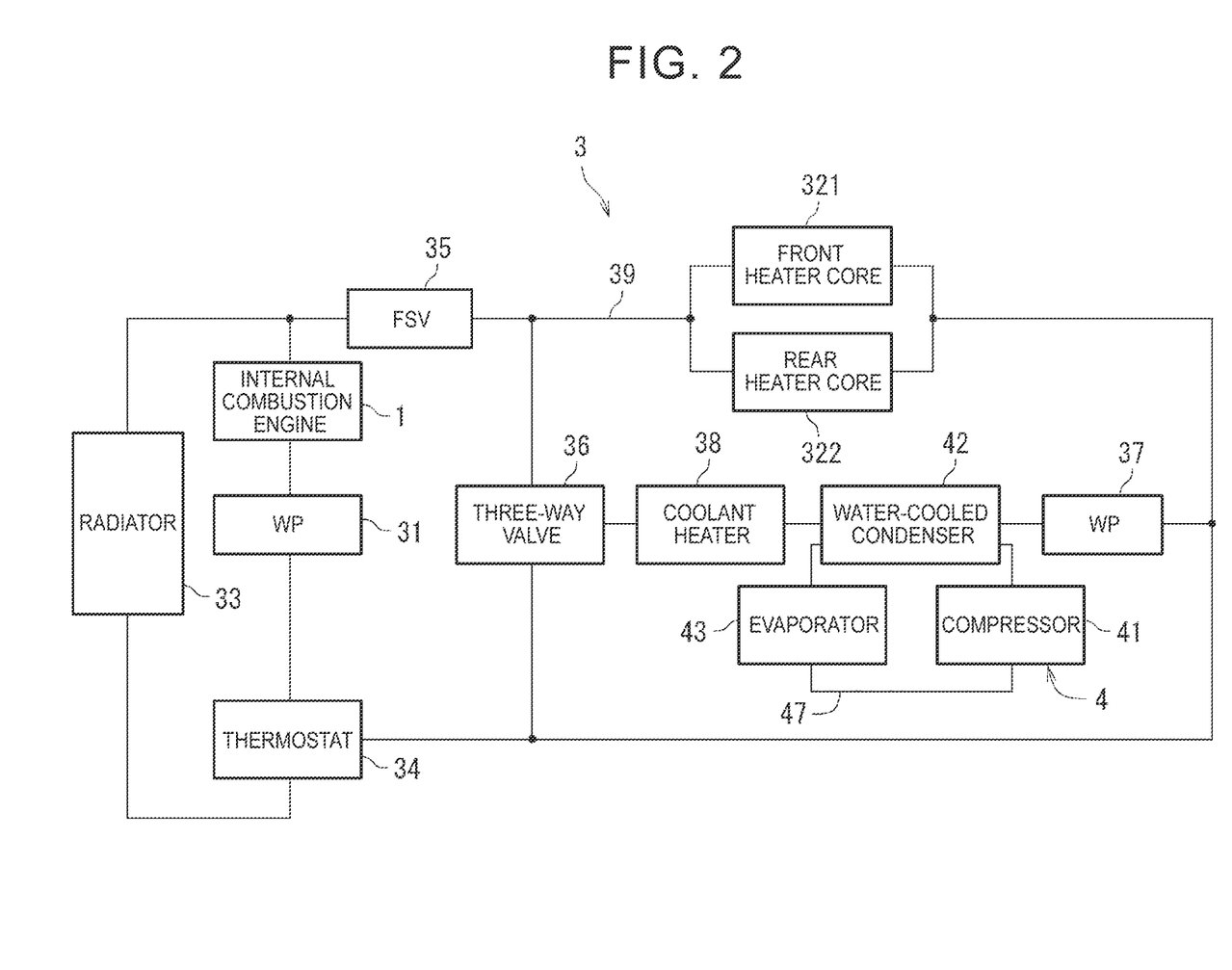
FIG. 2 is a diagram for describing a coolant circuit to be controlled by the ECU of FIG. 1.

As illustrated in FIG. 1, the vehicle 100 is a hybrid vehicle including an internal combustion engine 1 and a motor 2 as traveling drive sources. The internal combustion engine 1 outputs a traveling drive force by burning fuel. The motor 2 outputs a traveling drive force by using electric power from a battery 21, and is controlled by a power control unit (PCU) 22 including an inverter. The motor 2 mainly functions as an electric motor, and also functions as an electric generator depending on situations. The battery 21 is chargeable and dischargeable, and stores electric power for driving the motor 2.

The vehicle 100 can heat a vehicle cabin. As illustrated in FIG. 2, the vehicle 100 includes a coolant circuit 3 and a heat pump 4. The coolant circuit 3 includes a water pump (WP) 31, the internal combustion engine 1, a front heater core 321, a rear heater core 322, a radiator 33, a thermostat 34, a flow shutting valve (FSV) 35, a three-way valve 36, a water pump 37, a water-cooled condenser 42 of the heat pump 4, a coolant heater 38, and a coolant passage 39 connecting those components. The coolant circuit 3 is an example of "vehicle coolant circuit" of the present disclosure.

The water pump 31 circulates a coolant (heat medium) in the coolant circuit 3 during operation of the internal combustion engine 1. The water pump 31 is an electric pump whose rotation speed is adjustable.

The internal combustion engine 1 has a water jacket, and is cooled by the coolant flowing through the water jacket. A coolant inlet of the water jacket is connected to a discharge port of the water pump 31. A coolant outlet of the water jacket is connected to coolant inlets of the front heater core 321 and the rear heater core 322 via the FSV 35, and is also connected to a coolant inlet of the radiator 33.

The front heater core 321 and the rear heater core 322 heat the vehicle cabin by using heat of the coolant. For example, an air conditioner of the vehicle 100 includes front-seat and rear-seat blower ducts (not illustrated). The front-seat blower duct has an air blower 511 (see FIG. 1) configured to generate blow air, and the front heater core 321 configured to heat the blow air. Conditioned air heated by the front heater core 321 is blown toward a front seat from an air outlet. The rear-seat blower duct has an air blower 512 (see FIG. 1) configured to generate blow air, and the rear heater core 322 configured to heat the blow air. Conditioned air heated by the rear heater core 322 is blown toward a rear seat from an air outlet. For example, the air blowers 511 and 512 are driven when heating the vehicle cabin.

For example, the front heater core 321 and the rear heater core 322 are arranged in parallel. Coolant outlets of the front heater core 321 and the rear heater core 322 are connected to one coolant inlet of the thermostat 34. The front heater core 321 is an example of "heat using portion" and "heater core" of the present disclosure. The rear heater core 322 is an example of "heat using portion" and "heater core" of the present disclosure.

The radiator 33 cools the coolant flowing through the radiator 33 with outside air by exchanging heat between the coolant and the outside air. A coolant outlet of the radiator 33 is connected to the other coolant inlet of the thermostat 34.

For example, the thermostat 34 is electronically controlled to switch the coolant flows into the radiator 33 or not.

The thermostat 34 includes a valve element, a spring, thermowax, and a heater. The valve element opens or closes the other coolant inlet. The spring urges the valve element in a valve closing direction. When the temperature of the coolant is equal to or higher than a predetermined value, the thermowax expands to open the valve element. The heater heats the thermowax to forcibly open the valve element even if the temperature of the coolant is lower than the predetermined value. A coolant outlet of the thermostat 34 is connected to a suction port of the water pump 31.

The FSV 35 and the three-way valve 36 switch coolant circulation paths. Specifically, during heating in a state in which the internal combustion engine 1 is stopped, the FSV 35 and the three-way valve 36 form a coolant circulation path in which the coolant does not pass through the internal combustion engine 1. The FSV 35 is arranged in the coolant passage 39 between the internal combustion engine 1 and each of the front heater core 321 and the rear heater core 322, and opens or closes the coolant passage 39.

During the heating in the state in which the internal combustion engine 1 is stopped, the water pump 37 circulates the coolant in the coolant circuit 3. The water pump 37 is an electric pump whose rotation speed is adjustable. A suction port of the water pump 37 is connected to the coolant passage 39 between the thermostat 34 and each of the front heater core 321 and the rear heater core 322. A discharge port of the water pump 37 is connected to a coolant inlet of the water-cooled condenser 42 of the heat pump 4.

The heat pump 4 heats the coolant during the heating in the state in which the internal combustion engine 1 is stopped. The heat pump 4 includes a compressor 41, the water-cooled condenser 42, an evaporator 43, and a refrigerant passage 47 connecting those components. The compressor 41 discharges a high-temperature and high-pressure gas refrigerant to circulate the refrigerant in a refrigerant circuit. The compressor 41 is an electric compressor whose rotation speed is adjustable. The water-cooled condenser 42 has a refrigerant channel and a coolant channel, and heats the coolant flowing through the coolant channel by using the refrigerant flowing through the refrigerant channel. The evaporator 43 exchanges heat between outside air and the refrigerant flowing through the evaporator 43. For example, the coolant heating performance of the heat pump 4 is adjustable. The water-cooled condenser 42 is an example of "heat source" and "heat exchanger" of the present disclosure.

The coolant heater 38 heats the coolant during the heating in the state in which the internal combustion engine 1 is stopped. The coolant heater 38 is an electric heater configured to heat the coolant by generating heat through energization. For example, the coolant heating performance of the coolant heater 38 is adjustable. A coolant inlet of the coolant heater 38 is connected to a coolant outlet of the water-cooled condenser 42. The coolant heater 38 is an example of "heat source" of the present disclosure.

A coolant outlet of the coolant heater 38 is connected to a coolant inlet of the three-way valve 36. One coolant outlet of the three-way valve 36 is connected to the coolant passage 39 between the water pump 37 and the thermostat 34. The other coolant outlet of the three-way valve 36 is connected to the coolant passage 39 between the FSV 35 and each of the front heater core 321 and the rear heater core 322.

Example of Operation of Coolant Circuit

During the operation of the internal combustion engine 1, the water pump 31 is driven in the coolant circuit 3 in a state in which the FSV 35 is open and the coolant inlet of the three-way valve 36 is connected to the one coolant outlet of the three-way valve 36. When the valve element of the thermostat 34 is closed, the coolant discharged from the water pump 31 is heated while passing through the water jacket of the internal combustion engine 1. The heated coolant flows into the front heater core 321 and the rear heater core 322. The coolant flowing out of the front heater core 321 and the rear heater core 322 returns to the water pump 31 via the thermostat 34. A majority of the coolant flowing from the front heater core 321 and the rear heater core 322 toward the thermostat 34 bypasses the water pump 37, the water-cooled condenser 42, the coolant heater 38, and the three-way valve 36, and a part of the coolant passes through the water pump 37, the water-cooled condenser 42, the coolant heater 38, and the three-way valve 36. When the valve element of the thermostat 34 is open, a part of the coolant flowing out of the internal combustion engine 1 is cooled by flowing into the radiator 33, and returns to the water pump 31 via the thermostat 34. When heating the vehicle cabin during the operation of the internal combustion engine 1, exhaust heat of the internal combustion engine 1 is used as described above.

During the stop of the internal combustion engine 1, the FSV 35 is closed, and the coolant inlet of the three-way valve 36 is connected to the other coolant outlet of the three-way valve 36. Therefore, the coolant circulation path in which the coolant does not pass through the internal combustion engine 1 is formed in the coolant circuit 3. When heating the vehicle cabin during the stop of the internal combustion engine 1, the water pump 37 is driven, and the coolant discharged from the water pump 37 is heated while passing through the water-cooled condenser 42 and the coolant heater 38. The heated coolant flows into the front heater core 321 and the rear heater core 322 via the three-way valve 36. The coolant flowing out of the front heater core 321 and the rear heater core 322 is sucked into the water pump 37.

ECU

As illustrated in FIG. 1, the vehicle 100 includes the ECU 6 configured to control the vehicle 100. For example, the ECU 6 includes a processor serving as a calculator and a memory, and sensors and control targets are connected to the ECU 6. The ECU 6 is an example of "control device" of the present disclosure.

For example, an inside air temperature sensor 61, an outside air temperature sensor 62, a solar radiation sensor 63, and a coolant temperature sensor 64 are connected to the ECU 6. The inside air temperature sensor 61 detects a temperature of air in the vehicle cabin (inside air temperature). The outside air temperature sensor 62 detects a temperature of air outside the vehicle cabin (outside air temperature). The solar radiation sensor 63 detects a solar radiation amount in the vehicle cabin. The coolant temperature sensor 64 detects a temperature of the coolant in the coolant circuit 3.

The ECU 6 controls traveling of the vehicle by controlling the internal combustion engine 1 and the motor 2 in cooperation based on, for example, detection results from the sensors. The ECU 6 also controls the air conditioner including the coolant circuit 3 and the heat pump 4.

Specifically, during the heating in the state in which the internal combustion engine 1 is stopped, the ECU 6 calculates a target coolant temperature, and controls the heat pump 4 and the coolant heater 38 based on the target coolant temperature. The ECU 6 corrects the target coolant temperature in consideration of a loss of heat of the coolant in the coolant passage 39 (pipe heat loss).

Coolant Temperature Control

Next, coolant temperature control to be executed by the ECU 6 of the first embodiment is described with reference to FIG. 3. For example, the coolant temperature control is executed during the heating in the state in which the internal combustion engine 1 is stopped. That is, the coolant temperature control is executed when the water pump 37 is driven in a state in which the FSV 35 is closed and the coolant inlet of the three-way valve 36 is connected to the other coolant outlet of the three-way valve 36, and the coolant discharged from the water pump 37 flows into the water-cooled condenser 42, the coolant heater 38, the three-way valve 36, the front heater core 321, and the rear heater core 322 and returns to the water pump 37. The following steps are executed by the ECU 6.

Figure 3:
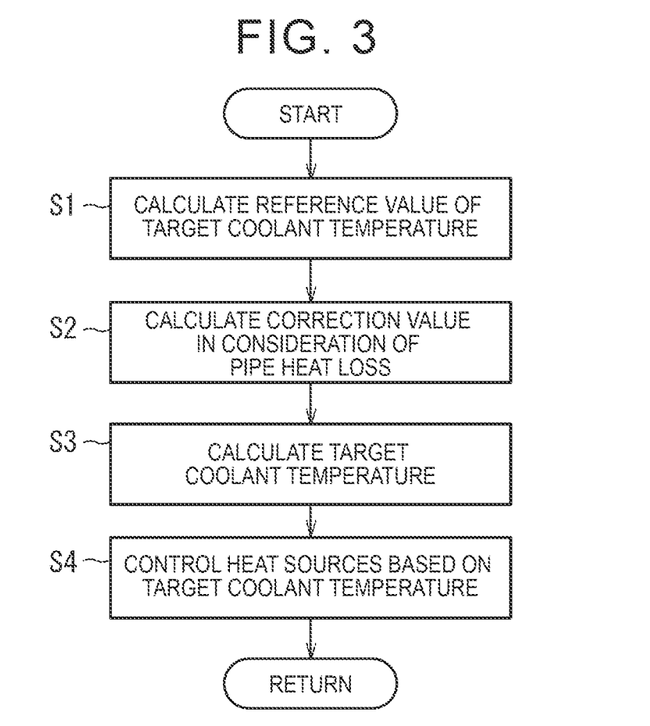
FIG. 3 is a flowchart for describing coolant temperature control to be executed by the ECU.

In Step S1 of FIG. 3, a reference value $TWO1s$ of a target coolant temperature is calculated. For example, the reference value $TWO1s$ of the target coolant temperature is calculated based on a target blow temperature TAO, and increases as the target blow temperature TAO increases. The target blow temperature TAO is a target temperature of conditioned air to be supplied to the vehicle cabin, and corresponds to a heating load requested in the air conditioner. For example, the target blow temperature TAO is calculated based on a set temperature in the vehicle cabin, an inside air temperature, an outside air temperature, and a solar radiation amount.

Figure 4:
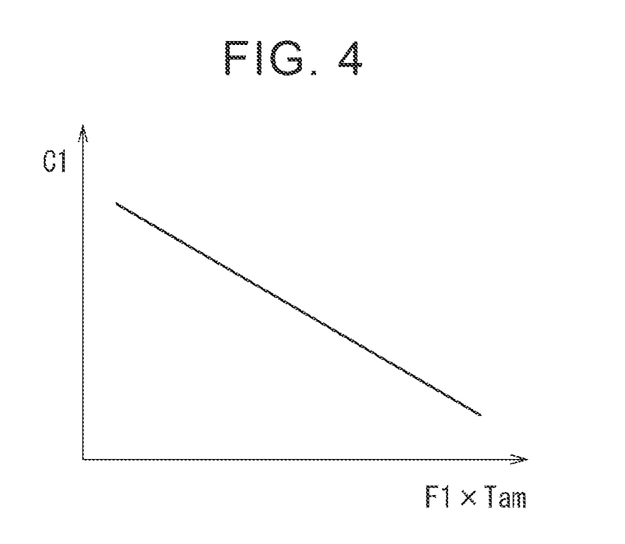
FIG. 4 illustrates an example of a map for calculating a correction value in consideration of a pipe heat loss.

In Step S2, a correction value C1 of the target coolant temperature is calculated in consideration of a pipe heat loss. The correction value C1 is calculated based on a coolant flow rate F1 and an outside air temperature Tam. For example, the correction value C1 is derived by using a map illustrated in FIG. 4. In the map of FIG. 4, a vertical axis represents the correction value C1, and a horizontal axis represents a product of the coolant flow rate F1 and the outside air temperature Tam. The correction value C1 increases as the coolant flow rate F1 decreases, and also increases as the outside air temperature Tam decreases. This is because the pipe heat loss increases as the coolant flow rate F1 decreases, and also increases as the outside air temperature Tam decreases. For example, the coolant flow rate F1 is calculated based on a rotation speed of the water pump 37. The outside air temperature Tam is detected by the outside air temperature sensor 62.

In Step S3, a target coolant temperature TWO1 is calculated. For example, the target coolant temperature TWO1 is calculated by using Expression (1).

$$TWO1 = TWO1s + C1 \qquad (1)$$

That is, the target coolant temperature TWO1 is calculated by adding, to the reference value $TWO1s$ of the target coolant temperature, the correction value C1 of the target coolant temperature obtained in consideration of the pipe heat loss. In other words, the target coolant temperature TWO1 is corrected to increase by the correction value C1 from the reference value $TWO1s$ to cancel out a decrease in the temperature of the coolant due to the pipe heat loss.

In Step S4, the heat pump 4 and the coolant heater 38 are controlled based on the target coolant temperature TWO1. Specifically, the heat pump 4 and the coolant heater 38 are controlled such that a current coolant temperature detected by the coolant temperature sensor 64 approaches the target coolant temperature TWO1. For example, the coolant heating performance of each of the heat pump 4 and the coolant heater 38 is increased when the current coolant temperature is lower than the target coolant temperature TWO1, and is reduced when the current coolant temperature is higher than the target coolant temperature TWO1. The change rate of the coolant heating performance of each of the heat pump 4 and the coolant heater 38 may be increased as a deviation between the current coolant temperature and the target coolant temperature TWO1 increases. When changing the coolant heating performance of each of the heat pump 4 and the coolant heater 38, either the heat pump 4 or the coolant heater 38 may be controlled, or both of the heat pump 4 and the coolant heater 38 may be controlled.

Effects

In the first embodiment described above, the decrease in the temperature of the coolant due to the loss of the heat of the coolant in the coolant passage 39 (pipe heat loss) can be suppressed by correcting the target coolant temperature in consideration of the pipe heat loss. Thus, a lack of a heating capacity due to the pipe heat loss can be suppressed to secure air-conditioning comfort in the vehicle cabin.

In the first embodiment, the correction value C1 can appropriately be calculated in consideration of the pipe heat loss by calculating the correction value C1 based on the coolant flow rate F1 and the outside air temperature Tam.

Second Embodiment

Next, the overall configuration of a vehicle 100a to which an ECU 6a according to a second embodiment of the present disclosure is applied is described with reference to FIG. 5 and FIG. 6.

Figure 5:
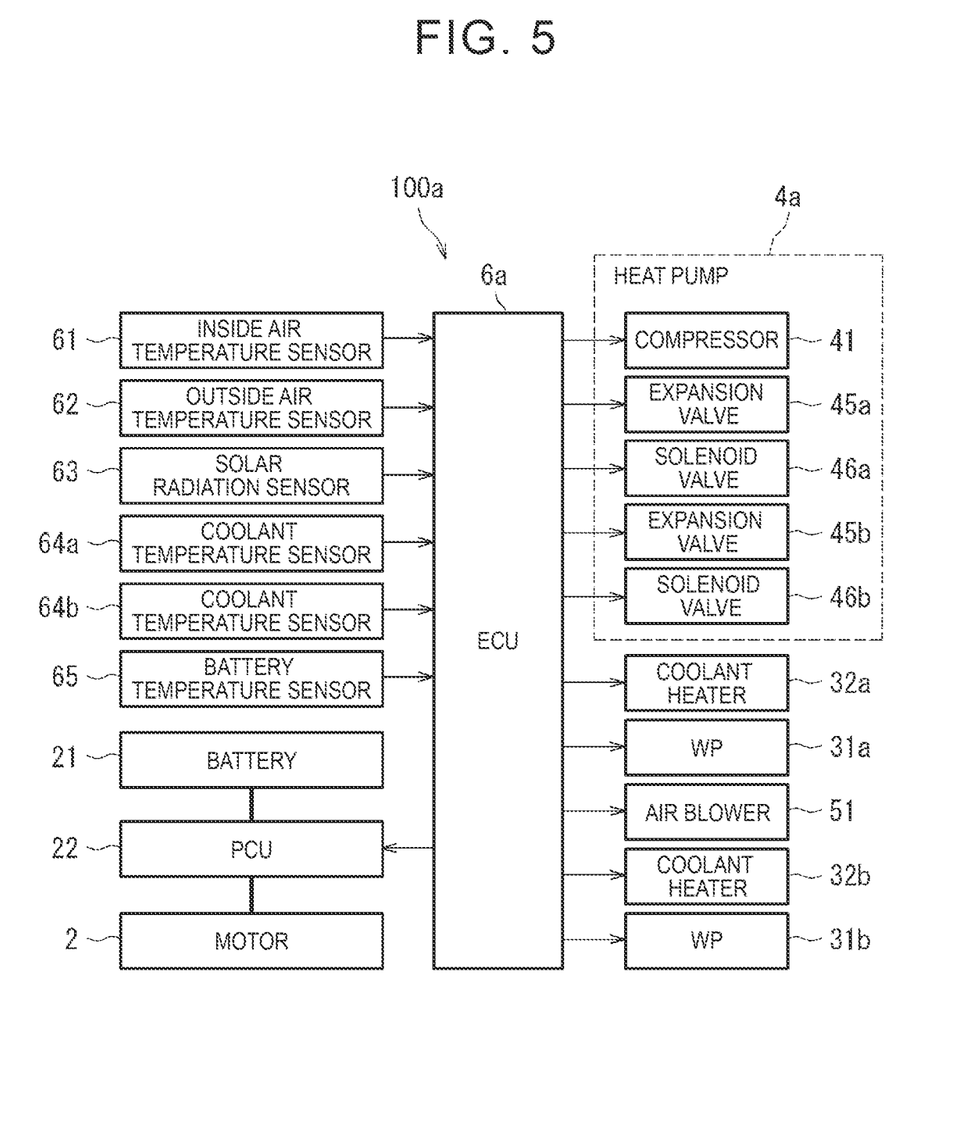
FIG. 5 is a block diagram illustrating the overall configuration of an ECU of a second embodiment.
Figure 6:
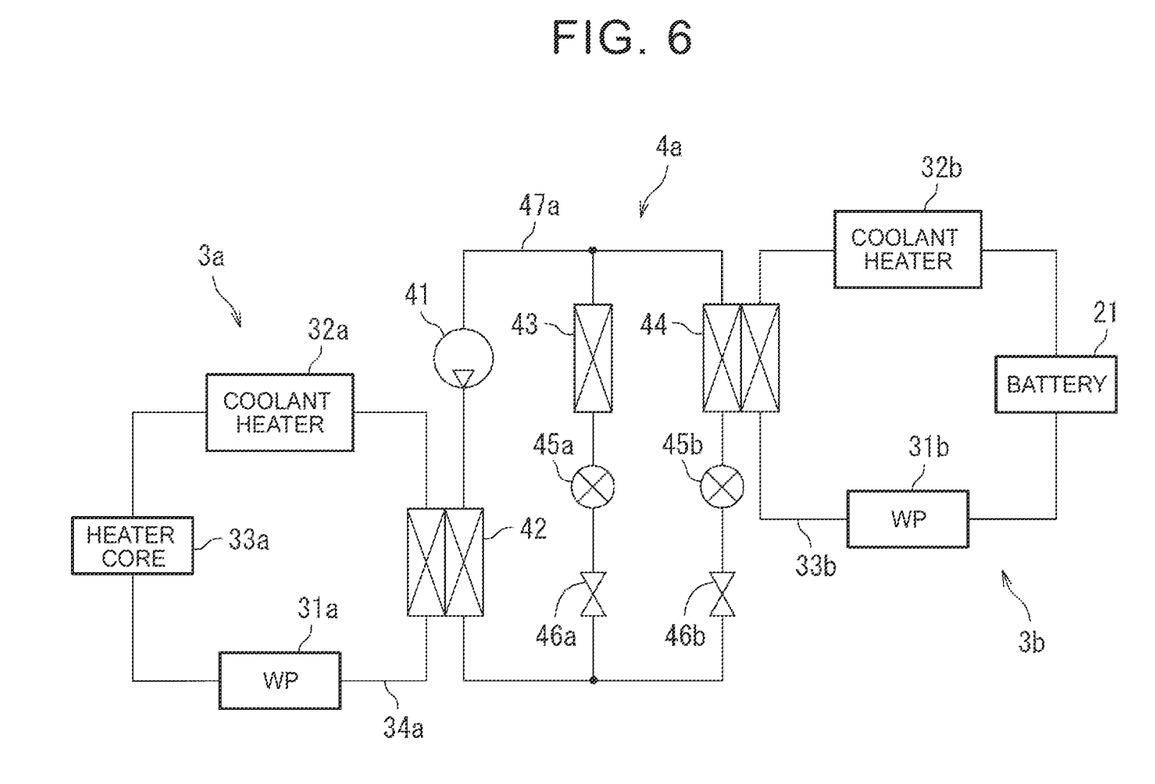
FIG. 6 is a diagram for describing a coolant circuit to be controlled by the ECU of FIG. 5.

As illustrated in FIG. 5, the vehicle 100a is an electric vehicle including the motor 2 as a traveling drive source. Unlike the vehicle 100 of the first embodiment, the vehicle 100a of the second embodiment does not have the internal combustion engine 1 (see FIG. 1).

The vehicle 100a can heat a vehicle cabin and warm the battery 21. The vehicle 100a has a heating-only mode, a warming-only mode, and a heating-and-warming mode as operation modes of an air conditioner. As illustrated in FIG. 6, the vehicle 100a includes coolant circuits 3a and 3b and a heat pump 4a.

Heat Pump

The heat pump 4a heats a coolant in the coolant circuit 3a when heating the vehicle cabin, and heats a coolant in the coolant circuit 3b when warming the battery 21. For example, the coolant heating performance of the heat pump 4a for the coolant circuits 3a and 3b is adjustable. The heat pump 4a includes the compressor 41, the water-cooled condenser 42, the evaporator 43, a chiller 44, expansion valves 45a and 45b, solenoid valves 46a and 46b, and a refrigerant passage 47a connecting those components.

The compressor 41 discharges a high-temperature and high-pressure gas refrigerant to circulate the refrigerant in a refrigerant circuit. The compressor 41 is an electric compressor whose rotation speed is adjustable. In the heating-only mode or the heating-and-warming mode, the water-cooled condenser 42 heats the coolant in the coolant circuit 3a by exchanging heat between the refrigerant in the refrigerant circuit and the coolant in the coolant circuit 3a. The water-cooled condenser 42 is an example of "heat source" and "heat exchanger" of the present disclosure.

The solenoid valve 46a can open or close the refrigerant passage 47a to switch the refrigerant flows into the evaporator 43 or not. The solenoid valve 46a is open in the heating-only mode. The expansion valve 45a expands the refrigerant passing through the expansion valve 45a by reducing a pressure of the refrigerant. In the heating-only mode, the evaporator 43 exchanges heat between outside air and the refrigerant flowing through the evaporator 43.

The solenoid valve 46b can open or close the refrigerant passage 47a to switch the refrigerant flows into the chiller 44 or not. The solenoid valve 46b is open in the warming-only mode or the heating-and-warming mode. The expansion valve 45b expands the refrigerant passing through the expansion valve 45b by reducing a pressure of the refrigerant. In the warming-only mode or the heating-and-warming mode, the chiller 44 heats the coolant in the coolant circuit 3b by exchanging heat between the refrigerant in the refrigerant circuit and the coolant in the coolant circuit 3b. The chiller 44 is an example of "heat source" and "heat exchanger" of the present disclosure.

Coolant Circuits

The coolant circuit 3a includes a water pump (WP) 31a, the water-cooled condenser 42, a coolant heater 32a, a heater core 33a, and a coolant passage 34a connecting those components. The coolant circuit 3a is an example of "vehicle coolant circuit" of the present disclosure.

The water pump 31a circulates the coolant (heat medium) in the coolant circuit 3a in the heating-only mode or the heating-and-warming mode. The water pump 31a is an electric pump whose rotation speed is adjustable.

The coolant heater 32a heats the coolant in the coolant circuit 3a in the heating-only mode or the heating-and-warming mode. The coolant heater 32a is an electric heater configured to heat the coolant by generating heat through energization. For example, the coolant heating performance of the coolant heater 32a is adjustable. The coolant heater 32a is an example of "heat source" of the present disclosure.

The heater core 33a heats the vehicle cabin by using heat of the coolant in the coolant circuit 3a. The air conditioner of the vehicle 100a includes a blower duct (not illustrated) that is a passage of blow air. The blower duct has an air blower 51 (see FIG. 5) configured to generate blow air, and the heater core 33a configured to heat the blow air. Conditioned air heated by the heater core 33a is blown toward the vehicle cabin from an air outlet. The air blower 51 is driven in the heating-only mode or the heating-and-warming mode. The heater core 33a is an example of "heat using portion" of the present disclosure.

The coolant circuit 3b includes a water pump (WP) 31b, the chiller 44, a coolant heater 32b, the battery 21, and a coolant passage 33b connecting those components. The coolant circuit 3b is an example of "vehicle coolant circuit" of the present disclosure.

The water pump 31b circulates the coolant (heat medium) in the coolant circuit 3b in the warming-only mode or the heating-and-warming mode. The water pump 31b is an electric pump whose rotation speed is adjustable.

The coolant heater 32b heats the coolant in the coolant circuit 3b in the warming-only mode or the heating-and-warming mode. The coolant heater 32b is an electric heater configured to heat the coolant by generating heat through energization. For example, the coolant heating performance of the coolant heater 32b is adjustable. The coolant heater 32b is an example of "heat source" of the present disclosure.

The battery 21 has a water jacket, and is warmed by the coolant flowing through the water jacket in the warming-only mode or the heating-and-warming mode. The battery 21 is an example of "heat using portion" of the present disclosure.

Heating-Only Mode

The heating-only mode is set when the heating of the vehicle cabin is requested and the warming of the battery 21 is not requested. For example, the heating of the vehicle cabin is requested when the inside air temperature is lower than a set temperature in the vehicle cabin. In the heating-only mode, the compressor 41 of the heat pump 4a is driven in a state in which the solenoid valve 46a is open and the solenoid valve 46b is closed. The high-temperature and high-pressure refrigerant discharged from the compressor 41 returns to the compressor 41 via the water-cooled condenser 42 and the evaporator 43. The refrigerant releases heat when passing through the water-cooled condenser 42, and receives heat when passing through the evaporator 43.

In the coolant circuit 3a, the water pump 31a is driven, and the coolant discharged from the water pump 31a is heated when passing through the water-cooled condenser 42 and the coolant heater 32a. The heated coolant heats the blow air when passing through the heater core 33a. The coolant flowing out of the heater core 33a is sucked into the water pump 31a. In the coolant circuit 3b, the water pump 31b is stopped.

Warming-Only Mode

The warming-only mode is set when the warming of the battery 21 is requested and the heating of the vehicle cabin is not requested. For example, the warming of the battery 21 is requested when the temperature of the battery 21 is lower than a lower limit value of a preset temperature range. In the warming-only mode, the compressor 41 of the heat pump 4a is driven in a state in which the solenoid valve 46a is closed and the solenoid valve 46b is open. The high-temperature and high-pressure refrigerant discharged from the compressor 41 returns to the compressor 41 via the water-cooled condenser 42 and the chiller 44. In the coolant circuit 3a, the water pump 31a is stopped, and the refrigerant hardly releases heat when passing through the water-cooled condenser 42. The superheated refrigerant whose pressure is reduced by the expansion valve 45b releases heat when passing through the chiller 44.

In the coolant circuit 3b, the water pump 31b is driven, and the coolant discharged from the water pump 31b is heated when passing through the chiller 44 and the coolant heater 32b. The heated coolant heats the battery 21 when passing through the water jacket of the battery 21. The coolant flowing out of the water jacket of the battery 21 is sucked into the water pump 31b.

Heating-and-Warming Mode

The heating-and-warming mode is set when the heating of the vehicle cabin is requested and the warming of the battery 21 is requested. In the heating-and-warming mode, the compressor 41 of the heat pump 4a is driven in a state in which the solenoid valve 46a is closed and the solenoid valve 46b is open. The high-temperature and high-pressure refrigerant discharged from the compressor 41 returns to the compressor 41 via the water-cooled condenser 42 and the chiller 44. The refrigerant releases heat when passing through the water-cooled condenser 42 and the chiller 44. Specifically, the refrigerant flows into the chiller 44 while keeping the superheated state by reducing the heat release amount of the refrigerant in the water-cooled condenser 42 as compared to that in the heating-only mode. Therefore, the hot-gas refrigerant releases heat when passing through the water-cooled condenser 42, and the superheated refrigerant whose pressure is reduced by the expansion valve 45b releases heat when passing through the chiller 44.

In the coolant circuit 3a, the water pump 31a is driven, and the coolant discharged from the water pump 31a is heated when passing through the water-cooled condenser 42 and the coolant heater 32a. The heated coolant heats the blow air when passing through the heater core 33a. The coolant flowing out of the heater core 33a is sucked into the water pump 31a.

In the coolant circuit 3b, the water pump 31b is driven, and the coolant discharged from the water pump 31b is heated when passing through the chiller 44 and the coolant heater 32b. The heated coolant heats the battery 21 when passing through the water jacket of the battery 21. The coolant flowing out of the water jacket of the battery 21 is sucked into the water pump 31b.

ECU

As illustrated in FIG. 5, the vehicle 100a includes the ECU 6a configured to control the vehicle 100a. For example, the ECU 6a includes a calculator and a memory, and sensors and control targets are connected to the ECU 6a. The ECU 6a is an example of "control device" of the present disclosure.

For example, the inside air temperature sensor 61, the outside air temperature sensor 62, the solar radiation sensor 63, coolant temperature sensors 64a and 64b, and a battery temperature sensor 65 are connected to the ECU 6a. The coolant temperature sensor 64a detects a temperature of the coolant in the coolant circuit 3a. The coolant temperature sensor 64b detects a temperature of the coolant in the coolant circuit 3b. The battery temperature sensor 65 detects a temperature of the battery 21.

The ECU 6a controls traveling of the vehicle by controlling the motor 2 based on, for example, detection results from the sensors. The ECU 6a also controls the air conditioner including the coolant circuits 3a and 3b and the heat pump 4a.

Specifically, in the heating-only mode or the heating-and-warming mode, the ECU 6a calculates a target coolant temperature in the coolant circuit 3a, and controls the heat pump 4a and the coolant heater 32a based on the target coolant temperature. The ECU 6a corrects the target coolant temperature in consideration of a loss of heat of the coolant in the coolant passage 34a (pipe heat loss).

In the warming-only mode or the heating-and-warming mode, the ECU 6a calculates a target coolant temperature in the coolant circuit 3b, and controls the heat pump 4a and the coolant heater 32b based on the target coolant temperature. The ECU 6a corrects the target coolant temperature in consideration of a loss of heat of the coolant in the coolant passage 33b (pipe heat loss).

Coolant Temperature Control for Coolant Circuit 3a

Next, coolant temperature control for the coolant circuit 3a to be executed by the ECU 6a of the second embodiment is described with reference to FIG. 3. For example, the coolant temperature control for the coolant circuit 3a is executed in the heating-only mode or the heating-and-warming mode. The following steps are executed by the ECU 6a.

In Step S1 of FIG. 3, a reference value TWO2s of a target coolant temperature is calculated. For example, the reference value TWO2s of the target coolant temperature is calculated based on the target blow temperature TAO, and increases as the target blow temperature TAO increases.

In Step S2, a correction value C2 of the target coolant temperature is calculated in consideration of a pipe heat loss. The correction value C2 is calculated based on a coolant flow rate F2 in the coolant circuit 3a and the outside air temperature Tam. For example, the correction value C2 is derived by using a map similar to the map of FIG. 4. The correction value C2 increases as the coolant flow rate F2 decreases, and also increases as the outside air temperature Tam decreases. This is because the pipe heat loss increases as the coolant flow rate F2 decreases, and also increases as the outside air temperature Tam decreases. For example, the coolant flow rate F2 is calculated based on a rotation speed of the water pump 31a. The outside air temperature Tam is detected by the outside air temperature sensor 62.

In Step S3, a target coolant temperature TWO2 is calculated. For example, the target coolant temperature TWO2 is calculated by using Expression (2).

$$TWO2=TWO2s+C2 \quad (2)$$

That is, the target coolant temperature TWO2 is calculated by adding, to the reference value TWO2s of the target coolant temperature, the correction value C2 of the target coolant temperature obtained in consideration of the pipe heat loss. In other words, the target coolant temperature TWO2 is corrected to increase by the correction value C2 from the reference value TWO2s to cancel out a decrease in the temperature of the coolant due to the pipe heat loss.

In Step S4, the heat pump 4a and the coolant heater 32a are controlled based on the target coolant temperature TWO2. Specifically, the heat pump 4a and the coolant heater 32a are controlled such that a current coolant temperature in the coolant circuit 3a that is detected by the coolant temperature sensor 64a approaches the target coolant temperature TWO2. Either the heat pump 4a or the coolant heater 32a may be controlled, or both of the heat pump 4a and the coolant heater 32a may be controlled.

Coolant Temperature Control for Coolant Circuit 3b

Next, coolant temperature control for the coolant circuit 3b to be executed by the ECU 6a of the second embodiment is described with reference to FIG. 3. For example, the coolant temperature control for the coolant circuit 3b is executed in the warming-only mode or the heating-and-warming mode. The following steps are executed by the ECU 6a.

In Step S1 of FIG. 3, a reference value TWO3s of a target coolant temperature is calculated. For example, the reference value TWO3s of the target coolant temperature is calculated based on a battery temperature TB, and decreases along with an increase in the battery temperature TB. The battery temperature TB is a temperature of the battery 21 that is detected by the battery temperature sensor 65.

In Step S2, a correction value C3 of the target coolant temperature is calculated in consideration of a pipe heat loss. The correction value C3 is calculated based on a coolant flow rate F3 in the coolant circuit 3b and the outside air temperature Tam. For example, the correction value C3 is derived by using a map similar to the map of FIG. 4. The correction value C3 increases as the coolant flow rate F3 decreases, and also increases as the outside air temperature Tam decreases. This is because the pipe heat loss increases as the coolant flow rate F3 decreases, and also increases as the outside air temperature Tam decreases. For example, the coolant flow rate F3 is calculated based on a rotation speed of the water pump 31b. The outside air temperature Tam is detected by the outside air temperature sensor 62.

In Step S3, a target coolant temperature TWO3 is calculated. For example, the target coolant temperature TWO3 is calculated by using Expression (3).

$$TWO3=TWO3s+C3 \quad (3)$$

That is, the target coolant temperature TWO3 is calculated by adding, to the reference value TWO3s of the target coolant temperature, the correction value C3 of the target coolant temperature obtained in consideration of the pipe heat loss. In other words, the target coolant temperature TWO3 is corrected to increase by the correction value C3 from the reference value TWO3s to cancel out a decrease in the temperature of the coolant due to the pipe heat loss.

In Step S4, the heat pump 4a and the coolant heater 32b are controlled based on the target coolant temperature TWO3. Specifically, the heat pump 4a and the coolant heater 32b are controlled such that a current coolant temperature in the coolant circuit 3b that is detected by the coolant temperature sensor 64b approaches the target coolant temperature TWO3. Either the heat pump 4a or the coolant heater 32b may be controlled, or both of the heat pump 4a and the coolant heater 32b may be controlled.

Effects

In the second embodiment described above, the decrease in the temperature of the coolant in the coolant circuit 3a due to the loss of the heat of the coolant in the coolant passage 34a (pipe heat loss) can be suppressed by correcting the target coolant temperature in consideration of the pipe heat loss. Thus, a lack of a heating capacity due to the pipe heat loss can be suppressed to secure air-conditioning comfort in the vehicle cabin.

In the second embodiment, the decrease in the temperature of the coolant in the coolant circuit 3b due to the loss of the heat of the coolant in the coolant passage 33b (pipe heat loss) can be suppressed by correcting the target coolant temperature in consideration of the pipe heat loss. Thus, a lack of a warming capacity due to the pipe heat loss can be suppressed.

Other effects of the second embodiment are similar to those of the first embodiment.

Other Embodiments

The embodiments disclosed herein are illustrative in all respects, and are not the basis for limitative interpretation. The technical scope of the present disclosure is not interpreted based on the embodiments alone, but is defined based on the description of the claims. The technical scope of the present disclosure encompasses meanings of equivalents to the elements in the claims and all modifications within the scope of the claims.

For example, the front heater core 321 and the rear heater core 322 are described in the first embodiment as the examples of the heat using portion, and the heater core 33a and the battery 21 are described in the second embodiment as the examples of the heat using portion. The applicable embodiment is not limited to this case. A heat using portion other than the heater core and the battery may be provided.

In the first embodiment, the water-cooled condenser 42 and the coolant heater 38 are described as the examples of the heat source. The applicable embodiment is not limited to this case. A heat source other than the heat exchanger of the heat pump and the coolant heater may be provided. The same applies to the second embodiment.

The first embodiment is directed to the example in which the correction value C1 is calculated in consideration of the pipe heat loss based on the coolant flow rate F1 and the outside air temperature Tam. The applicable embodiment is not limited to this case. The correction value may be calculated in consideration of the pipe heat loss based on the coolant flow rate or the outside air temperature, or based on a parameter other than the coolant flow rate and the outside air temperature. The same applies to the second embodiment.

The first embodiment is directed to the example in which the target coolant temperature TWO1 is calculated based on the reference value TWO1s and the correction value C1 and the heat pump 4 and the coolant heater 38 are controlled such that the actual coolant temperature approaches the target coolant temperature TWO1. The applicable embodiment is not limited to this case. The target coolant temperature may be calculated based on the reference value and the correction value, and the heat pump and the coolant heater may be controlled such that the actual coolant temperature approaches a predetermined target coolant temperature range including the target coolant temperature. The same applies to the second embodiment.

Description is given of the example in which the front heater core 321 and the rear heater core 322 are provided in the coolant circuit 3 in the first embodiment and the heater core 33a is provided in the coolant circuit 3a in the second embodiment. The applicable embodiment is not limited to this case. Any number of heater cores may be provided in the coolant circuit.

In the first embodiment, the coolant temperature control illustrated in FIG. 3 may be executed during heating in a state in which the internal combustion engine 1 is operating.

In the first embodiment, the ECU 6 may include a plurality of ECUs, and the ECUs may be connected in a communicable manner. The same applies to the second embodiment.

The present disclosure is applicable to a control device and a control method for controlling a vehicle coolant circuit including a water pump configured to circulate a coolant, a plurality of heat sources configured to heat the coolant, a heat using portion configured to use heat of the coolant, and a coolant passage connecting the water pump, the heat sources, and the heat using portion.

What is claimed is:

1. A control device configured to control a vehicle coolant circuit including a water pump configured to circulate a coolant, a plurality of heat sources configured to heat the coolant, a heat using portion configured to use heat of the coolant, and a coolant passage configured to connect the water pump, the heat sources, and the heat using portion, the control device comprising a processor configured to:
   calculate a target coolant temperature and control the heat sources based on the target coolant temperature;
   correct the target coolant temperature by increasing the target coolant temperature in consideration of a loss of the heat of the coolant in the coolant passage;
   calculate, based on a coolant flow rate, a correction value for correcting the target coolant temperature in consideration of the loss of the heat of the coolant in the coolant passage; and
   calculate the coolant flow rate based on rotation speed of the water pump.

2. The control device according to claim 1, wherein the processor is configured to calculate, based on an outside air temperature, the correction value for correcting the target coolant temperature in consideration of the loss of the heat of the coolant in the coolant passage.

3. The control device according to claim 1, wherein:
   the heat using portion is a battery; and
   the processor is configured to control the vehicle coolant circuit to use the heat of the coolant for warming the battery.

4. The control device according to claim 1, wherein the heat sources include a coolant heater and a heat exchanger of a heat pump.

5. The control device according to claim 1, wherein the heat using portion is a heater core, and the processor is configured to control the vehicle coolant circuit to use the heat of the coolant for heating a vehicle cabin.

6. A control method for controlling a vehicle coolant circuit including a water pump configured to circulate a coolant, a plurality of heat sources configured to heat the coolant, a heat using portion configured to use heat of the coolant, and a coolant passage configured to connect the water pump, the heat sources, and the heat using portion, the control method comprising:
   calculating, by a processor, a target coolant temperature and correcting, by the processor, the target coolant temperature by increasing the target coolant temperature in consideration of a loss of the heat of the coolant in the coolant passage;
   controlling, by the processor, the heat sources based on the corrected target coolant temperature;
   calculate, by the processor, based on a coolant flow rate, a correction value for correcting the target coolant temperature in consideration of the loss of the heat of the coolant in the coolant passage; and
   calculate, by the processor, the coolant flow rate based on rotation speed of the water pump.

* * * * *